Oct. 9, 1923.
C. E. FULLER
1,470,558
GRAVITY CONVEYER
Filed Nov. 8, 1921
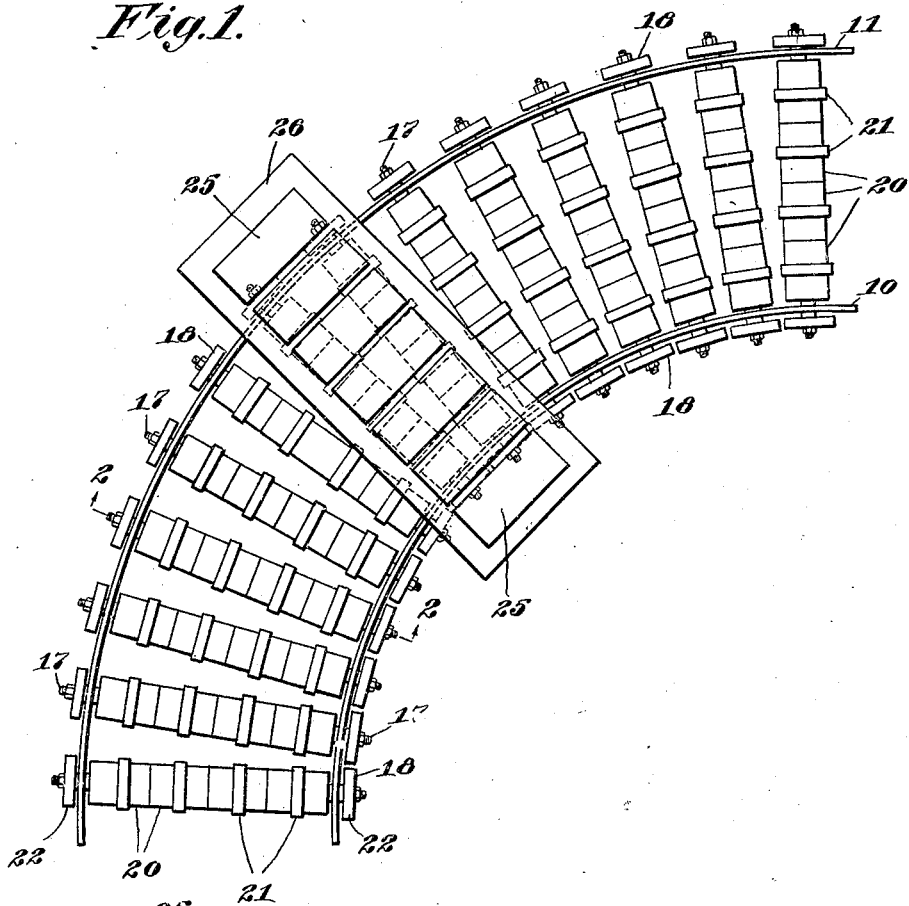
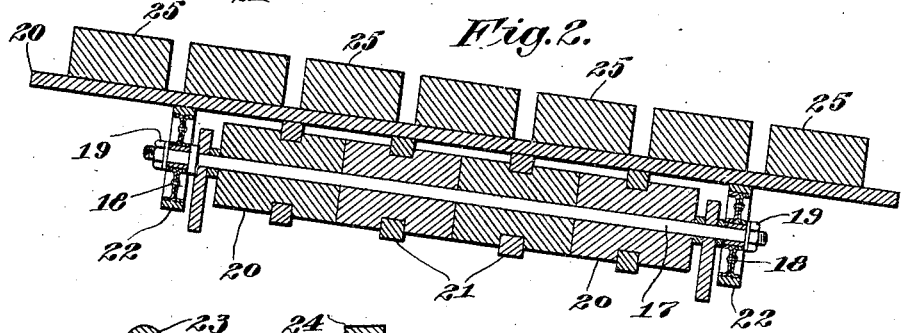
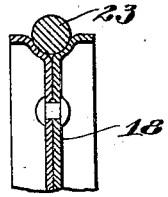

Patented Oct. 9, 1923.

1,470,558

UNITED STATES PATENT OFFICE.

CLAUD E. FULLER, OF NEW YORK, N. Y.

GRAVITY CONVEYER.

Application filed November 8, 1921. Serial No. 513,687.

*To all whom it may concern:*

Be it known that I, CLAUD E. FULLER, a citizen of the United States, and a resident of New York, in the county of New York and State of New York, have invented an Improvement in Gravity Conveyers, of which the following description, in connection with the accompanying drawings, is a specification, like letters on the drawings representing like parts.

My present invention relates to conveyers, and more particularly to gravity conveyers for use in handling packaged material, or material during the course of manufacturing the same.

In gravity conveyers, as heretofore constructed, no successful means has been developed for properly conveying material around curves and corners, and therefore, the use of such conveyers has been limited to situations in which the position of each article, or bundle of articles, with relation to each other, is relatively unimportant. In attempting to utilize such prior gravity conveyers in a brick manufacturing plant, where a plurality or group of green brick are positioned parallel to each other on a pallet, it was found that while on a straight run the pallets were held parallel to each other, yet on the curves and corners, this relative position of the pallets was disturbed, and once disturbed, they must be again positioned parallel to each other by manual labor. It was found that the disturbing factor was the rolls utilized in the conveyer. the weight of the material being conveyed tending to concentrate on the inner edge of the curve; that is, the inner end of the pallet moved faster than the outer end thereof, the outer end actually slipping rearwardly. I have overcome this defect in prior structures, and in my present invention have supplemented the usual rolls at the inner and outer edges of the curves by the addition of a plurality of rollers intermediate said outer and inner rollers, and have shod all said rollers with tires or shoes of resilient material, such as rubber, fibre, or the like. Such tires or shoes may be of any desired contour, as round, square, or the like.

The object of my present invention therefore, is an improved gravity conveyer in which means is provided for conveying material from one straight section of the conveyer to another straight section around a curve or corner and delivering such material to the second straight section in the same relative position it left the first straight section.

In the accompanying drawings illustrating the preferred embodiment of my invention, Fig. 1 is a plan view of a curve of a gravity conveyer to which my invention has been applied;

Fig. 2 is a section on the line 2—2 of Fig. 1;

Fig. 3 is a fragmentary section of one form of conveyer wheel or roller, and

Fig. 4 is a fragmentary section of another form of conveyer wheel or roller.

Referring to the drawings, 10 designates the inside and 11 the outside frame members of a curve of a gravity conveyer connecting one straight section of the conveyer with another, these members being supported and spaced from each other in any usual and ordinary manner. I have, in my improved construction, provided a plurality of shafts 17, radially disposed with respect to the center of the curve and on these shafts, exterior of the frame members 10 and 11, I journal rollers 18, nuts 19 threading onto the ends of the shafts 17 holding said rollers 18 in position. Between the frame members 10 and 11, and on the shafts 17, I journal a plurality of rollers 20 of equal diameter, enough rollers 20 being employed to fill the space between the frame members 10 and 11. Each of these rollers 20 are shod with a tire or shoe 21 of resilient material, such as rubber, and also each of the rollers 18 is similarly shod with tires or shoes 22. I may shoe the rollers 18 with tires or shoes, such as shown in Fig. 2, or I may, if desired, form the rollers 18 as shown in Figs. 3 and 4, and form the tires or shoes therefor as designated at 23 and 24 respectively, it being understood that it is within the scope of my invention to make the tires or shoes of any form desired.

The material to be conveyed, in this particular instance such material being a plurality of bricks 25 placed on a pallet 26 parallel to each other, is delivered to the curved section of the conveyer from a straight section, and moves by gravity onto and over the rollers 18 and 20 and the weight of the pallet 26 and bricks 25 tends to keep the pallet 26 parallel with the shafts 17 throughout their travel along the curved section of the conveyer and they are thus delivered from the curved section to the other straight section in the same relative position in which they were delivered from the first straight section onto the curved section.

While I have necessarily described the preferred embodiment of my invention somewhat in detail, it is to be understood that I may vary the size, shape, and arrangement of parts constituting my improved device within wide limits without departing from the spirit of the invention.

Having thus described my invention, what I claim as new, is:

1. In a gravity conveyer, the combination of curved frame members spaced apart from each other, a plurality of radially disposed shafts mounted in said members, and rollers rotatably mounted on said shafts on either end thereof.

2. In a gravity conveyer, the combination of curved frame members spaced apart from each other, a plurality of radially disposed shafts mounted in said members, rollers rotatably mounted on said shafts on either end thereof, and tires of resilient material secured to the periphery of said rollers.

3. In a gravity conveyer, the combination of curved frame members spaced apart from each other, a plurality of radially disposed shafts mounted in said members, rollers rotatably mounted on said shafts on either end thereof, tires of resilient material secured to the periphery of said rollers, and a plurality of rollers mounted on said shafts and located between the frame members.

4. In a gravity conveyer, the combination of curved frame members spaced apart from each other, a plurality of radially disposed shafts mounted in said members, rollers rotatably mounted on said shafts on either end thereof, tires of resilient material secured to the periphery of said rollers, a plurality of rollers mounted on said shafts and located between the frame members, and tires of resilient material secured to the periphery of said last named rollers.

5. In a gravity conveyer, the combination of a pair of curved frame members spaced apart from each other and having their upper edges lying in the same plane, a plurality of stub shafts arranged along the length of each member, a conveying wheel for each stub shaft and rotatably mounted thereon and having their upper edges lying in a plane parallel to the plane containing the upper edges of the frame members, and resilient tires on each conveying wheel.

In testimony whereof I have signed my name to this specification.

CLAUD E. FULLER.